G. LYNN ET AL

July 25, 1933. METHOD OF PRODUCING HYDROGEN SULPHIDE Re. 18,902

2 Sheets-Sheet 1

Original Filed May 19, 1930

INVENTORS

George Lynn, Edward M. Allen & Brazier K. Beecher

BY

Brockett, Hyde, Higley & Meyer

ATTORNEYS

G. LYNN ET AL

July 25, 1933. METHOD OF PRODUCING HYDROGEN SULPHIDE Re. 18,902

2 Sheets-Sheet 2

Original Filed May 19, 1930

INVENTORS

George Lynn, Edward M. Allen
Brazier K. Beecher

BY

Brockett, Hyde, Higley & Meyer

ATTORNEYS

Reissued July 25, 1933

Re. 18,902

UNITED STATES PATENT OFFICE

GEORGE LYNN, OF WADSWORTH, AND EDWARD M. ALLEN AND BRAZIER K. BEECHER, OF BARBERTON, OHIO, ASSIGNORS TO PITTSBURGH PLATE GLASS COMPANY, OF PITTSBURGH, PENNSYLVANIA, A CORPORATION OF PENNSYLVANIA

METHOD OF PRODUCING HYDROGEN SULPHIDE

Original No. 1,862,900, dated June 14, 1932, Serial No. 453,592, filed May 19, 1930. Application for reissue filed February 15, 1933. Serial No. 657,756.

This invention relates to the production of hydrogen sulphide by a simple, inexpensive method, and more particularly to its production from sulphur by a wet method particularly adapted for practice in connection with the production of sodium carbonate by the ammonia soda process, such improved method also producing as another valuable product sodium thiosulphate or some other sulphur-oxygen salt of sodium.

One object of the invention is to simplify and cheapen the production of hydrogen sulphide and supply a new source of thiosulphate; and another object is to improve the operation of the ammonia soda process by the production for use in that process of cheap hydrogen sulphide by a method which utilizes the ingoing substances or output products of the ammonia soda process itself.

Figure 1:
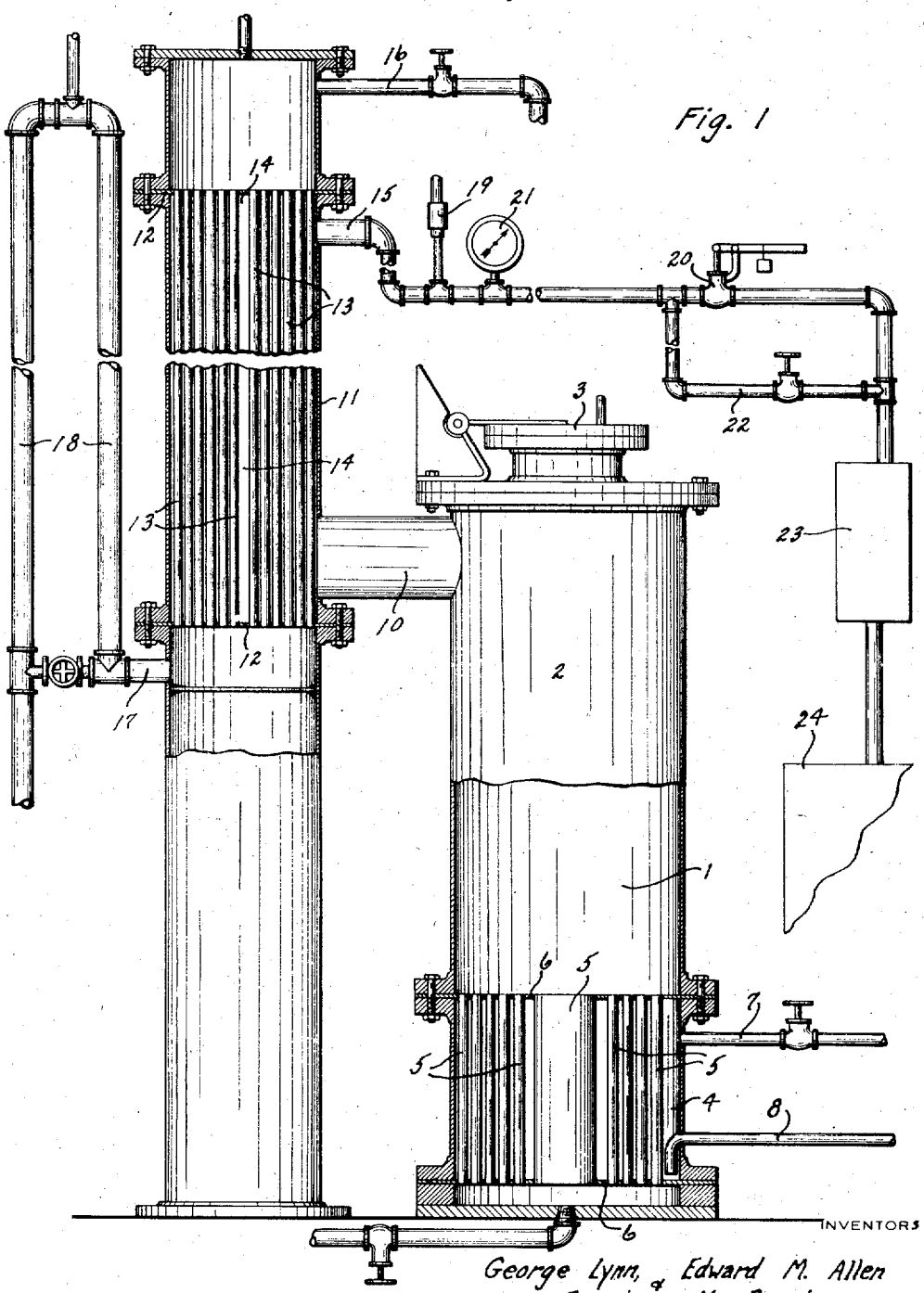
Figure 2:
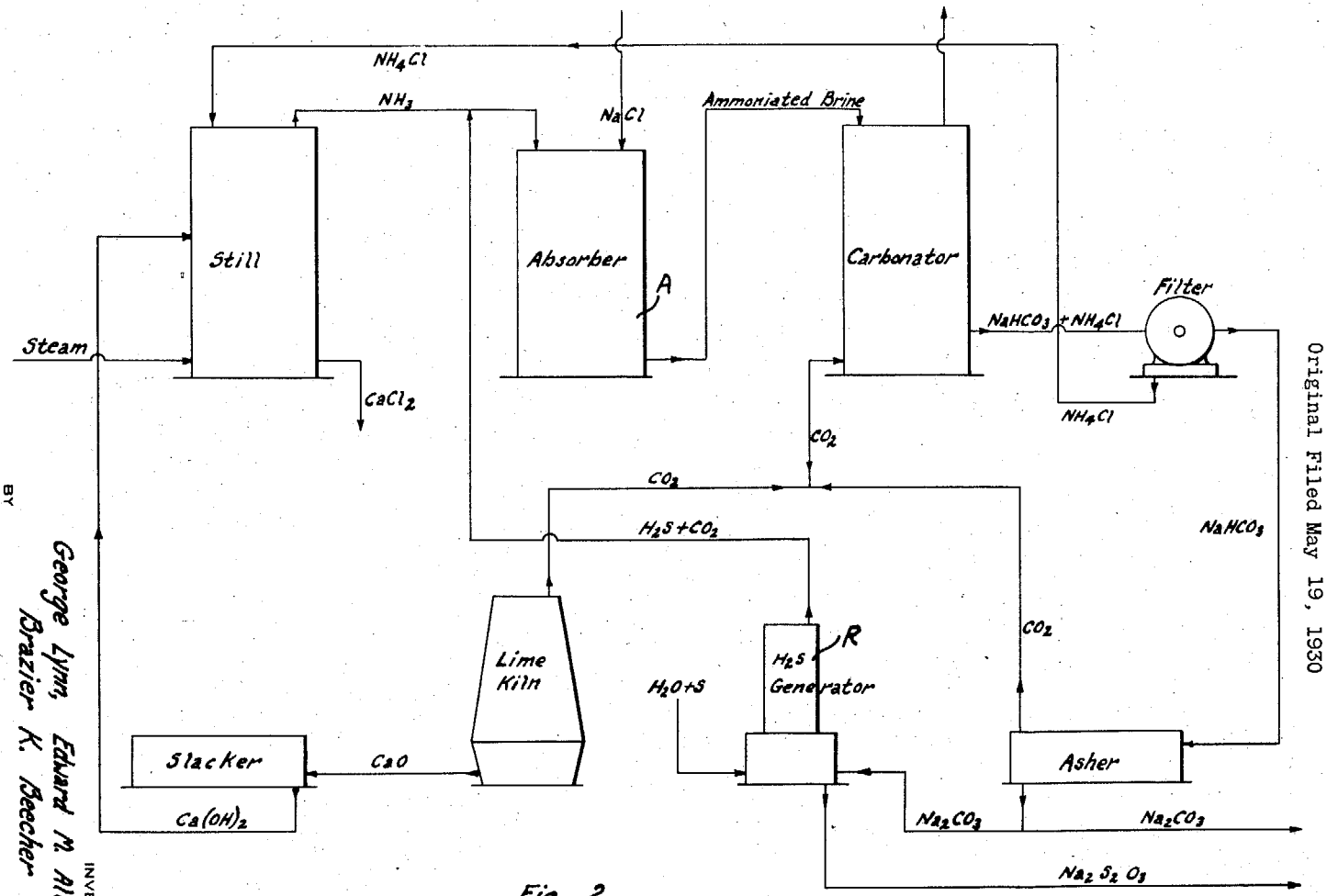

In the drawings, Fig. 1 represents, somewhat diagrammatically, a simple form of apparatus for producing hydrogen sulphide according to our method; and Fig. 2 is a diagram illustrating practice of the invention in connection with the ammonia soda process.

According to the present invention, hydrogen sulphide is produced by a wet method as the result of a reaction or reactions in the presence of water between sulphur and a suitable alkali or alkaline substance. Such a method, properly performed, not only produces hydrogen sulphide, but also produces a sulphur-oxygen salt, such as the thiosulphate or sulphate of the particular alkali employed, and may also produce $CO_2$ as an additional product, as will appear. The method is therefore suitable for practice for the production of any one or more of the hydrogen sulphide, the $CO_2$ or the thiosulphate, or the like, whichever may be the most important. For convenience, in the present description, the invention will be discussed from the standpoint of primary production of hydrogen sulphide with the $CO_2$ and thiosulphate or the like referred to as by-products, although not necessarily limited thereto.

The several ingredients or raw materials mixed together are subjected to heat and preferably to a relatively high temperature under conditions favorable for complete reaction, the result being the conversion of practically all of the sulphur, part of which becomes hydrogen sulphide and part thiosulphate or the like. In practice, it is found that a relatively high temperature is preferable because of the reduction in the time for reaction. Usually, temperatures above the normal boiling point of the solution are most satisfactory, although lower temperatures may be employed. For convenience it is found desirable to conduct the reaction under pressure greater than atmospheric, thereby enabling temperatures above the normal boiling point of the solution to be produced and maintained, with resulting rapid action and more nearly complete reaction between the substances under treatment.

While the process may be performed either intermittently or continuously and in any suitable form of apparatus for the purpose, the drawings illustrate one very simple intermittent system including a chamber 1 within a suitable casing 2 provided with a charging door 3. Near the bottom of said chamber it is provided with heating means, such as a steam chamber 4 within which are a series of pipes 5 joined at their ends to plates 6, enabling the material which is treated to circulate through the pipes 5, heating steam being circulated through the chamber 4 from the supply pipe 7 to the outlet pipe 8.

The upper part of the chamber, below the charging door, communicates by a pipe 10 with a suitable condenser which may be of any suitable form, such as a reflux condenser. In the arrangement shown, this condenser is constructed in a manner somewhat similar to the heating arrangement at the bottom of the treating retort. That is to say, it comprises a casing 11 in which are two plates 12 connected by a series of tubes 13 within a chamber 14, enabling the gas discharged through the pipe 10 to be passed through the chamber 14 around the tubes 13 to an outlet pipe 15. Cooling water is circulated through the pipes, flowing into the upper end of the casing from a supply pipe 16, thence through the upper and lower plates 12 and the pipes 13 connecting them and out through the outlet pipe 17, which preferably has a riser 18 for insuring that the condenser shall at all times be full of water.

The gas outlet pipe is preferably provided with pressure controlling and maintaining means, such as a valve 19 adjustable to open at a given pressure, a safety relief valve 20 set to blow off at a somewhat higher pressure, a pressure gauge 21, and a hand valve controlled by-pass 22 to fully open the outlet pipe when desired. Beyond these devices the outlet pipe may communicate with suitable purifying devices conventionally indicated at 23 and thence with a receiver 24.

In the use of this apparatus, the materials to be treated are charged into the chamber 1 through the door opening at 3. The sulphur may be any form of sulphur, such as raw or native sulphur, with purity depending upon the desired purity of the final products. The alkali or alkaline material may be of any suitable or desired form, but preferably should be a compound of one of the alkali metals.

For example, the hydrate, carbonate, bicarbonate, sulphide or any suitable equivalent, may be employed. In each case, one product will be hydrogen sulphide as a gas, either pure or mixed with $CO_2$, for example; while still another product is a sulphur oxygen salt, such as the thiosulphate, sulphate or the like, of the particular alkali employed. Assuming then that the retort is charged with sulphur, caustic soda and water, steam is circulated through the heating chamber and the temperature rises. By proper setting of the valves 19 and 20, a temperature above the normal boiling point of the solution at atmospheric pressure may readily be produced and maintained. At a suitable temperature the reaction is quickly carried to completion, essentially all of the sulphur being converted either to hydrogen sulphide by combination with the hydrogen of the water or to thiosulphate by combination with the alkali metal, and oxygen from the water. The reaction or reactions may be more or less progressive or by steps, and hence are somewhat difficult of exact definition. There is apparently a primary stage in which the sulphur goes into solution as polysulphide, since observation of the reaction in a glass retort indicates molten sulphur initially floating on the surface and later disappearing with simultaneous darkening of the solution, but such reaction is uncertain. In any event, the reactions possibly may be somewhat as follows:

$$\text{(A)} \quad 2H_2O+3S=2H_2S+SO_2$$

$$\text{(B)} \quad \left.\begin{matrix} 2NaOH \\ Na_2CO_3 \\ 2NaHCO_3 \\ H_2O+Na_2S \end{matrix}\right\}+SO_2=Na_2SO_3+\left\{\begin{matrix} H_2O \\ CO_2 \\ 2CO_2+H_2O \\ H_2S \end{matrix}\right.$$

$$\text{(C)} \quad Na_2SO_3+S=Na_2S_2O_3$$

By reaction (A) part of the sulphur joins the hydrogen on the one hand and part the oxygen on the other to form hydrogen sulphide and $SO_2$ respectively. The $SO_2$ thereupon reacts as in (B) with the alkali or alkaline substance present for the production of sodium sulphite. But, more than that, the sodium sulphite continues to react as in (C), absorbing additional sulphur with the ultimate production of the thiosulphate, so that the combined reactions result in the production from the initial ingredients, including water, of hydrogen sulphide and the thiosulphate, with additional evolution of $CO_2$ in case the alkali or alkaline substance is a carbonate or bicarbonate.

From the theoretical standpoint, reaction (A) ordinarily would not take place to any great extent, but in the presence of the alkaline material the $SO_2$ is absorbed as fast as formed and with the necessary sulphur the reaction goes further to the formation of the thiosulphate, as shown in (C). In other words, the $SO_2$ is removed by the alkali from the field of action and the $H_2S$ is also removed due to the boiling, these two effects causing the reaction to go to essential completion. The $H_2S$ (and $CO_2$ if present) accompanied by steam, passes to the condenser where the steam condenses and is permitted to trickle back to the retort, but the $H_2S$ (and $CO_2$ if present) is permitted to pass off at the top of the condenser.

The residue, consisting principally of solution of sodium thiosulphate, may readily be purified by removing impurities in any suitable manner. Some sodium sulphide may be formed and it may be removed by $FeSO_4$ or some other soluble salt of a metal forming an insoluble sulphide. The thiosulphate may be separated by crystallizing in one of its forms.

A suitable operating pressure for use with one hundred twenty-five pounds steam pressure in the heating belt, is about sixty pounds per square inch, and the operating temperature may be about 350° F. However, the operation is not limited to these conditions, which are satisfactory if the $H_2S$ is required in gaseous form, for by increasing the boiling temperature and the pressure, the latter can be made to exceed the liquefaction pressure and the $H_2S$ can be produced directly in liquid form without further mechanical compression. This is particularly true when the condenser water is made cool enough to maintain in the condenser a temperature at least as low as ordinary room temperature, 70° F. Even lower temperatures are advantageous. Of course, when liquid $H_2S$ is desired, it is preferable to avoid having $CO_2$ present, by using an alkali other than a carbonate, such as $Na_2S$ or NaOH. More than that, by utilizing these higher boiling temperatures and pressures, the method may be carried out for the production of other sulphur-oxygen salts of the particular alkali employed, such as sodium, for example, for the production of sulphites, sulphates, or the like. Again, the method is not limited to the use of sulphur and an alkali or alkaline substance as separate ingredients, but sulphur and an alkali or alkaline material, such as caustic soda, sodium bicarbonate, sodium carbonate or the like, may first be furnaced or fused together with some reaction, and the product may be crushed or ground and charged into the hydrogen sulphide generator for reaction, as described. Or, the two materials may be mixed wet, heated and dried, and introduced with or without fusing into the retort. In either case, the reactions and the products are approximately those heretofore described.

As a specific instance of practice of the process, 80 grams of caustic soda dissolved in 120 grams of water were treated with 128 grams of sulphur in an apparatus fitted with a reflux condenser, as described. Boiling was carried on at a pressure of sixty pounds per square inch to increase the speed of reaction and for a sufficient length of time until little or no further hydrogen sulphide was evolved. There was some evidence of traces of higher sulphides of hydrogen than $H_2S$ having been formed. After cooling down, the residue in the retort was a syrupy, supersaturated solution consisting largely of sodium thiosulphate containing small amounts of soluble sulphide and suspended iron sulphide. This was diluted with water and sufficient $FeSO_4$ was added to combine with the soluble sulphide. The solution was filtered hot and allowed to cool, whereupon crystals of a hydrated sodium thiosulphate were produced.

In another instance, where the invention was practiced on a larger and commercial scale, two hundred pounds of soda ash $Na_2CO_3$, were mixed with two hundred forty pounds of sulphur and fifty gallons of water, being treated in an apparatus similar to that described. The steam pressure for heating varied from eighty pounds to one hundred thirty pounds, the pressure being increased as the process continued, because during the later stages the yield or gas flow reduces and a higher temperature is desirable to speed the process and tends to increase the rate of yield. The pressure of the gases developed, to wit, hydrogen sulphide and carbon dioxide, varied from sixty to ninety pounds, and the rate of production was from five to ten cubic feet per minute.

The method described is of particular advantage in connection with the ammonia soda process, where it is the practice to supply to the circulating liquids a small proportion of hydrogen sulphide for the purpose of correcting the tendency of small quantities of iron to discolor the final product. The effect of the hydrogen sulphide may either be to precipitate FeS and thereby remove it in the settling operations, or to some extent coat the inner surfaces of the containers with a film of FeS and thus assist in preventing corrosion. Whatever may be the effect, a small proportion of hydrogen sulphide is always employed. In practice this material has commonly been introduced into the system by use of crude ammonia containing a relatively high hydrogen sulphide content, for which ammonia it is usually necessary to pay a premium. According to the present invention, any ordinary ammonia with a low hydrogen sulphide content may be employed, with consequent reduced ammonia cost, and the hydrogen sulphide may be produced by our method and be introduced separately to the apparatus. As a consequence, the hydrogen sulphide content of the liquor is wholly independent of the ammonia additions and the amount of hydrogen sulphide always may be adjusted according to the Fe correction factor and is not a mere incident of the ammonia supply, rising unnecessarily when the ammonia contains a high percentage of hydrogen sulphide and falling too low when the ammonia is lean in hydrogen sulphide.

According to our scheme of operation, as represented diagrammatically in Fig. 2, a portion of the alkali carbonate produced by the plant, either the bicarbonate or the normal carbonate, is diverted and is introduced into the hydrogen sulphide generator or retort R for treatment under proper conditions with water and sulphur for the production of hydrogen sulphide and $CO_2$. This retort is operated in the manner before described, its product being $H_2S$ and $CO_2$, and sodium thiosulphate. The gases are led back into the system at any suitable place, such as to the absorber A, although the particular place is immaterial. There is no economic loss of $CO_2$. By operating the hydrogen sulphide retort R with a production value in step with the requirements for hydrogen sulphide, the Fe correcting value always may be manipulated to keep pace with variations in conditions and always independently of or to take account of variations in the ammonia composition.

The thiosulphate produced as a by-product has a value of approximately $40.00 a ton in the open market today, and of course may be refined and its value thereby recovered. Obviously, therefore, the invention not only improves the practice of the ammonia soda process by divorcing the hydrogen sulphide content from the ammonia input, but also enables sodium thiosulphate to be produced as a valuable by-product.

What we claim is:

1. The method of producing hydrogen sulphide from sulphur and an alkali substance consisting in heating together sulphur and alkali substance in the presence of water at a temperature and pressure high enough so that the hydrogen sulphide thereby produced liquefies without further compression.

2. A method consisting in heating together sulphur and an alkali substance in the presence of water at a temperature above the normal boiling point of water and at a pressure above atmospheric, thereby producing hydrogen sulphide and a sulphur containing compound of the alkali employed, and continuing the reaction at such temperature and pressure until the sulphur containing compound becomes a sulphur-oxygen salt.

3. A method consisting in heating together sulphur and an alkaline substance in the presence of water at a temperature above the normal boiling point of water and at a pressure above atmospheric, thereby producing a vapor containing, among other things, hydrogen sulfide gas, fractionally condensing the vapor and returning the aqueous condensate, to thereby separate the hydrogen sulfide, and continuing the reaction at the said temperature and pressure until the alkali metal is converted to thiosulphate.

4. A modified ammonia soda process, consisting in diverting a part of the alkali carbonate, subjecting the same to heat in the presence of water and sulphur, thereby forming carbon dioxide and hydrogen sulphide, and introducing the carbon dioxide and hydrogen sulphide thereby formed to the ammonia soda cycle.

5. A modified ammonia soda process, consisting in diverting a part of the alkali carbonate, subjecting the same to heat in the presence of water and sulphur, thereby forming as gas a mixture of carbon dioxide and hydrogen sulphide and also forming a sulphur-oxygen salt of the alkali, introducing the mixture of carbon dioxide and hydrogen sulphide gases to the ammonia soda cycle, and recovering the sulphur-oxygen salt as thiosulphate.

GEORGE LYNN.
EDWARD M. ALLEN.
BRAZIER K. BEECHER.